United States Patent [19]

Hurni et al.

[11] 4,381,184
[45] Apr. 26, 1983

[54] EXTRUDER APPARATUS

[76] Inventors: Samuel Hurni, Aeschstrasse 89b, CH 4202 Duggingen; Hans R. Weber, Hinterberg 24, CH 9014 St. Gallen, both of Switzerland

[21] Appl. No.: 166,025
[22] Filed: Jul. 7, 1980

[30] Foreign Application Priority Data

Jul. 19, 1979 [CH] Switzerland ............... 6721/79

[51] Int. Cl.³ .............................................. B29F 3/04
[52] U.S. Cl. ..................................... 425/202; 425/381; 425/382 R; 425/466; 426/448; 426/449; 426/516
[58] Field of Search ............... 425/310, 311, 313, 202, 425/381, 382 N, 466, 197, 382 R; 426/448, 449, 516

[56] References Cited

U.S. PATENT DOCUMENTS

| | | |
|---|---|---|
| 410,822 | 9/1889 | Day ................................ 425/197 |
| 2,958,900 | 11/1960 | Meakin ....................... 425/466 X |
| 3,183,859 | 5/1965 | Peterson ..................... 425/466 X |
| 3,225,711 | 12/1965 | Forth et al. .................... 425/466 |
| 3,268,950 | 8/1966 | Rankin ........................... 425/466 |
| 3,292,211 | 12/1966 | Strange ....................... 425/466 X |
| 3,304,578 | 2/1967 | Clute . | 
| 3,327,653 | 6/1967 | Crane ............................. 425/311 |
| 3,414,941 | 12/1968 | Ignell ............................. 425/310 |
| 3,698,846 | 10/1972 | Leutner ...................... 425/381 X |
| 3,817,674 | 6/1974 | Paige ......................... 425/381 X |
| 3,957,256 | 5/1976 | Murakami . |
| 4,124,351 | 11/1978 | Garbuio ..................... 425/466 X |
| 4,248,579 | 2/1981 | Maejima .................... 425/466 X |

FOREIGN PATENT DOCUMENTS

| | | |
|---|---|---|
| 39957 | 11/1981 | European Pat. Off. ........... 426/516 |
| 836818 | 4/1952 | Fed. Rep. of Germany . |
| 1047416 | 6/1959 | Fed. Rep. of Germany . |
| 1122462 | 1/1962 | Fed. Rep. of Germany . |
| 1232335 | 7/1967 | Fed. Rep. of Germany . |
| 1529774 | 10/1971 | Fed. Rep. of Germany . |
| 2054616 | 11/1972 | Fed. Rep. of Germany . |
| 470585 | 3/1936 | United Kingdom . |
| 642160 | 10/1947 | United Kingdom . |
| 757607 | 10/1953 | United Kingdom . |
| 880055 | 1/1960 | United Kingdom . |
| 880055 | 10/1961 | United Kingdom . |
| 1046088 | 2/1964 | United Kingdom . |
| 1108875 | 7/1965 | United Kingdom . |
| 1153678 | 10/1967 | United Kingdom . |
| 1441340 | 2/1974 | United Kingdom . |
| 1441340 | 6/1976 | United Kingdom . |

OTHER PUBLICATIONS

G. Schenkel, "Neue Konzepte fur das autogene Regeln der Massemtemperatur im Extruderbetrieb", Kunststoffe, vol. 62, 1972, pp. 46–52.

Primary Examiner—Philip E. Anderson
Attorney, Agent, or Firm—Merchant, Gould, Smith, Edell, Welter & Schmidt

[57] ABSTRACT

For producing a hydrolized food product a stream of product is conveyed to a nozzle head (4) by means of a worm (1) and discharged via nozzles (8). Processed pieces of product are cut off from the stream of product one after another. The interrupter serving for this purpose displays a rotating element (5) that is arranged rigidly on the nozzle head side end of the worm (1) and rotates together with this latter. The rotating element (5) has recesses (10) that intermittently feed the stream of stock to the nozzle inlets (9) and sealing faces (12) that are arranged between the recesses (10) and seal the nozzle inlets (9) against the stream of stock between the feed phases. The edges (14) of the sealing faces (12), leading in the direction of rotation (13), guarantee the intermittent interruption of the stream of stock effecting cut-off of the pieces of product one after another.

15 Claims, 10 Drawing Figures

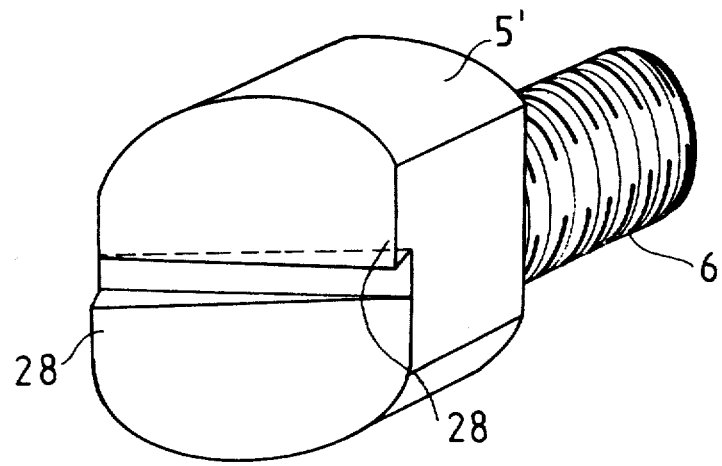
FIG.8
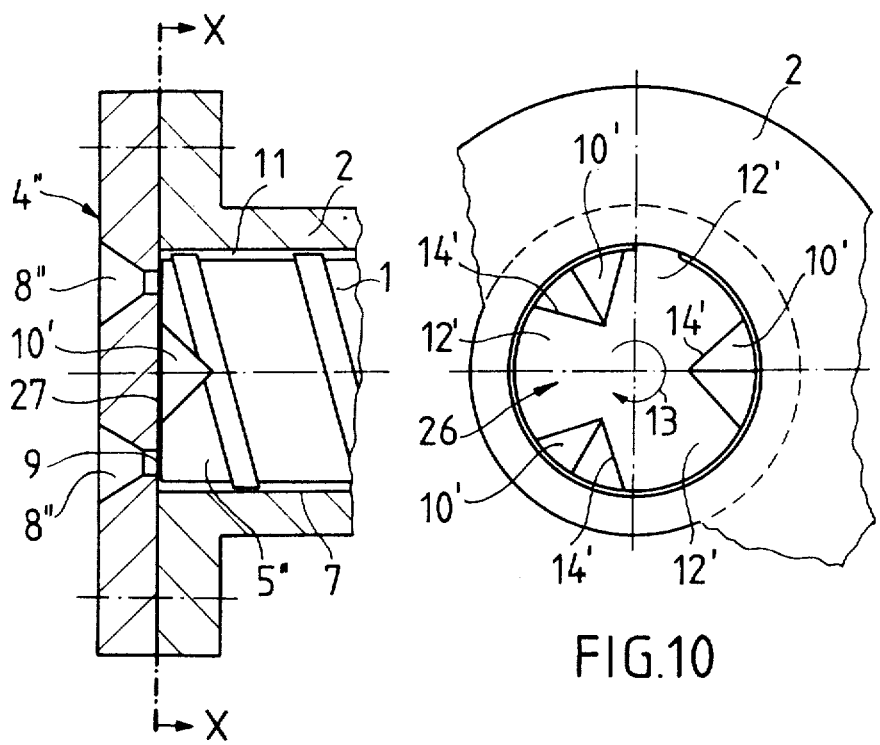
FIG.9
FIG.10

EXTRUDER APPARATUS

BACKGROUND OF THE INVENTION

1. Field of the Invention

The invention concerns an extruder apparatus that serves for the production of a product, in particular from the group of expanded starch products or structured protein products by working pressure, friction and possibly heat into a stock being fed in, and displaying a rotatably arranged worm that processes the stock and conveys it to a nozzle head that is arranged at the outlet end of the worm, and displaying at least one nozzle via which the product exits in preferably expanded pieces of product, as well as an interrupter serving for intermittent interruption of the stream of stock and which is provided for cutting off the pieces of product from the stream of stock.

2. Description of the Prior Art

In the case of one extruder apparatus of the previously mentioned type disclosed in DE-AS No. 1,122,462 serving for the production of an aerated corn meal product, a hollow stator is mounted in a stator housing. The stator housing has a feed opening via which a coarse-crushed corn meal mixture is supplied to the stator. A rotatable screw in the stator assures the processing and transport of the mixture to the outlet end of the screw. At the mixture discharge end, arranged together ahead or after the outlet nozzles, are knives that work together with the screw and have the task, in conjunction with the force that is exerted by the rotating feed screw, to press the mixture in a radial direction through a space that is provided between the forward face of the stator and the forward face of a rotor facing toward the stator. The knives, which can also serve for cutting off the product, are rigidly arranged on the rotor and rotate together with this latter. One each assembly with motor and gear train is provided for the feed screw and for the rotor. The apparatus is expensive and space-robbing, and unsuitable for many applications.

SUMMARY OF THE DISCLOSURE

The task for the invention is to obtain an extruder apparatus of the initially mentioned type whose construction, compared to the previously known one, is simpler and more economical, which, moreover, requiring less space, has a wider range of applications.

An extruder apparatus for resolution of this task includes an interrupter, active between the worm and the nozzle head, rigidly arranged relative to the worm and rotating together with this latter, which is a rotating element that displays at least one recess that guides the stream of stock and which can be brought intermittently into communication with the nozzles, along with one each sealing face adjacent to the recesses, that intermittently closes off the nozzle inlets and seals them off from the stream of stock, whereby leading edges of the sealing faces, in their passing movement at the nozzle inlets, interrupt the stream of stock to the nozzles and, in this fashion, successively cut off pieces of product from the stream of stock.

The invention has the following advantages. The rotating element serving as an interrupter is now arranged inside the worm housing and driven directly by the worm. It also acts as a mixing/kneading tool and thus increases the efficiency of the entire extruder. Because of this, a shortening of the worm and its housing is possible. The stock is conveyed up to the nozzles in a forced motion by the rotating element so that no blockages occur, neither in the start-up phase nor during operation. The sought-after effect of interrupting the stream of stock is achieved by cooperation of the rotating element with the inlet side edges of the nozzle, so that building on an auxiliary cutting device is made superfluous. No separate motor with gear train is required for the rotating element, since now all rotary movements take place via the worm. The contrivance is simple and economic and, compared with previously known ones, requires little space. The number of possible forms of embodiment is considerable, which lends to the apparatus an extensive capability of adaptation to the prevailing conditions of application. It can be used for the processing of starch carriers of all types, as for example corn, barley, tapioca, milocorn, cracked rice, potatoes, potato starches, or mixtures of same. It is likewise usable for protein-containing—and in any event oil-containing substances such as extraction-meal, non-defatted peanuts, sunflowers, wheat gluten and leguminous seeds.

In accordance with a first form of embodiment for the apparatus, where the nozzles are arranged in an outer mantle of the nozzle head and exit of the product pieces from the nozzle head takes place in a radial direction, the recesses are arranged on the periphery of the rotating element. The sealing faces are in turn structured on the periphery of the rotating element as segments of a cylindrical surface and guided in a cylindrical internal surface of the outer mantle mentioned. Here, the edges serving for interruption of the stream of stock are structured as lines of intersection of the sealing faces with the recesses. The edges and the recesses can run, advantageously rectilinearly or spirally, in the longitudinal direction.

This form of embodiment of the apparatus distinguishes itself through simplicity and good economy and is particularly suited for single-purpose installations that are working at predetermined, relatively low working pressures. Here, the nozzle cross sections are constant and embodied in accordance with the desired shape and size of the product cross section.

In another form of embodiment, provided in the nozzle head structured as a tube are slots running in the axial direction of the nozzle head. Arranged in each slot is a key that is displaceable in the axial direction and capable of being firmly maintained at a certain distance from the worm-side base surface of its slot relative to this latter. This distance is determinant for the size of the nozzle cross section and variable for changing this latter. By appropriate structuring of the effective end of the key and the base surface of the slot opposite to it, the shape of the nozzle cross section can also be changed. In this fashion, the size and shape of the product cross section can be influenced and the operating pressure changed between certain limits.

For this purpose, the key or wedges are preferably attached at the periphery of a piston that is displaceable in the axial direction inside the tube. The piston displays a piston rod that extends out in the direction facing away from the worm and is guided, in the axial direction, in an axial boring of a threaded ring screwed into the tube. The piston rod displays a thread on its end facing away from the piston and a nut screwed onto it, which rests on the forward face of the threaded ring facing away from the rotating element. In this manner, the wedges can be displaced in the axial direction and stopped in desired positions by turning the threaded ring.

In a very advantageous and operationally-safe variant of the precedingly described form of embodiment, arranged on the piston rod, between the piston and the threaded ring, is a spring contrivance. This latter can display several convex disk springs clamped on one over the other, or one or several spiral springs, and is dimensioned in accordance to the nozzle cross sections and pre-loaded corresponding to a desired value of operating pressure. Variations over time in operating pressure occasion a to-and-fro motion of the piston, corresponding changes of the nozzle cross sections and a continuous seeking of the equilibrium of the operating pressure about its desired value. The nozzles, together with the piston and the spring contrivance act, in this fashion, as a pressure valve with the tendency toward maintaining the operating pressure at least approximately constant at the desired value. By changing the pre-load, the basic setting of the nozzle cross section, and therewith the desired value of the operating pressure, can be changed.

With this form of embodiment it is advantageous to construct the rotating element with one or several teeth that extend out, in the direction of the piston, from the forward face turned toward the piston. These teeth are constructed for the purpose of removing the stock that is present, under some circumstances, in the space between the piston and the rotating element from said space. In another form of embodiment, the nozzle head is equipped with nozzles running in the axial direction of the worm. The recesses are arranged on the periphery of the rotating element and engage in the forward face of same that is facing away from the worm. The segments of said forward face, which are separated from one another by the recesses, act as sealing faces. They are pressed against an inner plane surface of the nozzle head lying opposite them and containing the nozzle inlets, and rotatable relative to said nozzle head. This form of embodiment is particularly simple and space-saving. It is also suited for single-purpose installations. In all precedingly described forms of embodiment, the rotating element can be rigidly joined with the worm or structured from one piece with it. It can also be structured as a high power shearing element. Moreover, the nozzle head can be rigidly joined with the worm housing or structured from one piece with it.

BRIEF SUMMARY OF THE INVENTION

The invention relates to an extruder installation for the production of a product, more particularly but not necessarily belonging to the group of expanded starch products or structured protein products, by action of pressure, friction and possibly heat on an introduced material. The installation has a rotatably mounted worm constructed and arranged to process the material and convey it to a nozzle head at the outlet end of the worm. The nozzle head has at least one nozzle through which the product issues from the nozzle head, and the nozzle is arranged so that the product issues from the nozzle head transversely with respect to the axis of rotation of the worm. The cross-sectional area of the nozzle is variable. In a preferred embodiment of the invention, the nozzle head is a tube and has at least one slot extending in the axial direction of the head, with a key being disposed in the slot so as to be axially displaceable and to be fixable relatively to the slot at a spacing from the end of the slot nearest the worm, so that the spacing determines the nozzle cross-section and is variable to vary the latter. Preferably, the key is secured on the periphery of a piston which is axially displaceable in the interior of the tube. The piston has a piston rod which projects in the direction away from the worm and is axially guided in the axial bore of a threaded ring screwed into the tube, with the piston rod at its end remote from the piston having a thread and a nut screwed thereon, the arrangement being such that by turning the threaded ring the key is displaceable axially relative to the slot and can be fixed in a selected position.

Forms of embodiment will be explained in the following with the aid of the drawings. Shown are:

FIG. 1 a fragmentary view of the nozzle head side portion of an extruder apparatus with radial product outlet, partially in axial section;

FIG. 2 a cross section along line II—II in FIG. 1;

FIG. 3 a cross sectional view of an alternate embodiment, similar to that taken along line II—II in FIG. 1;

FIG. 4 a cross sectional view of another embodiment, similar to that taken along line II—II in FIG. 1;

FIG. 5 a fragmentary view of the nozzle head side portion of an extruder apparatus with radial product outlet and variable nozzle cross sections, partially in axial section;

FIG. 6 a fragmentary cross sectional view taken along line VI—VI in FIG. 5;

FIG. 7 an apparatus similar to the one in FIG. 5 with self-adjusting nozzles for constant operating pressure, partially in axial section;

FIG. 8 a perspective view of the rotating element according to FIG. 7, with teeth structured on its forward face;

FIG. 9 a fragmentary view of the nozzle head side portion of an extruder apparatus with axial product outlet, partially in axial section, and FIG. 10 a fragmentary cross section taken along line X—X of FIG. 9.

DESCRIPTION OF THE PREFERRED EMBODIMENT

Figure 1:
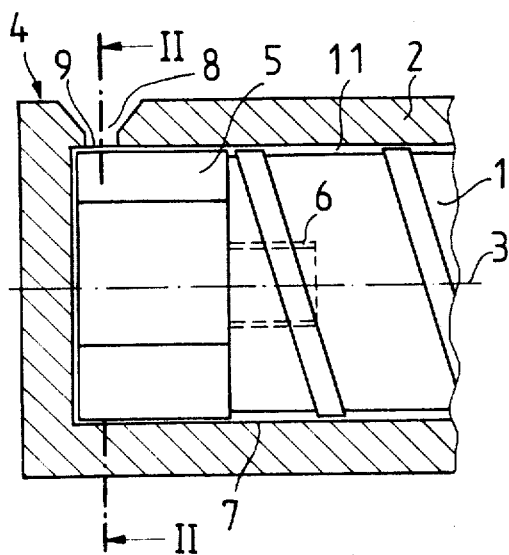

In the figures, the same parts carry the same reference numerals.

Figure 2:
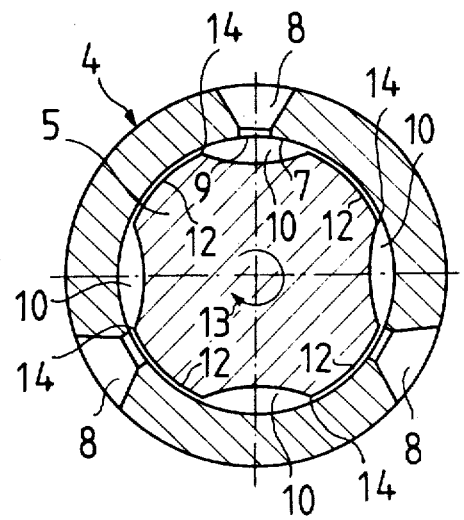

The apparatus in accordance with FIGS. 1 and 2 displays a worm 1 that is arranged rotatably about the axis of rotation 3 in a tubular bore of housing 2 that is structured as a tube. A nozzle head 4 is connected to the housing 2 and structured from one piece with this latter. Screwed in on the nozzle head side or outlet end of the worm 1, via threaded connection 6, and rotatable with it (the worm) is a rotating element 5. Structured inside the cylindrical mantle of the nozzle head 4 are the nozzles 8 whose inlets 9 start out from the cylindrical inner face 7 of the nozzle head 4.

On its periphery, the rotating element 5 has four recesses 10 that run in the axial direction and that are in communication with the stock stream guiding space 11 between the worm 1 and the housing 2. Arranged between adjacent recesses 10, on the periphery of the rotating element 5, are a total of four sealing faces 12 that are segments of a cylindrical outer surface of the rotating element 5, and are guided tightly in the cylindrical inner face 7 of the nozzle head 4. The sealing faces 12 are limited, in the peripheral direction, by two each edges that run parallel to the adjoining recesses 10. One of these is the edge 14, leading in the direction of rotation 13, which, in the case of the nozzles, effects the actual interruption of the stream of stock.

In operation, the stream of stock is moved forward by the worm 1, in space 11, with a forced movement, to the rotating element 5 and along the recesses 10. Each recess 10 contains a quantity of the stock and comes into communication with all nozzles 8 of nozzle head 4 once per revolution. In this press-in phase, the operating pressure acts on the stock and pushes it into the corresponding nozzle 8. The pressed-in quantity of stock grows, in the first half of the cycle, from zero to a maximum and falls back, in the second half of the cycle, from maximum to zero. In this fashion, the leading edge 14 of the subsequent sealing face 12, in its movement past the nozzle inlet, effects the interruption of the stream of stock and cut-off from the stream of stock of the piece of product that has just come out through nozzle 9. During the continuous rotating movement of the rotating element 5, the recesses 10 come into intermittent communication with the nozzles 8 and, at each encounter, press one each piece of product through the nozzles 8. These are in turn cut off from the stream of stock by the leading edge 14 of the subsequent sealing face. Finally, the sealing faces 12 arrive, in turn, over the inlets 9 of the nozzles 8 and seal or close these off, intermittently, against the stream of stock. Thus, the recesses and sealing faces are designed to alternately open and close the nozzles during rotation of the worm and interrupter. New pieces of product continue to be pushed out and cut off, one after the other, from the stream of stock.

Figure 3:
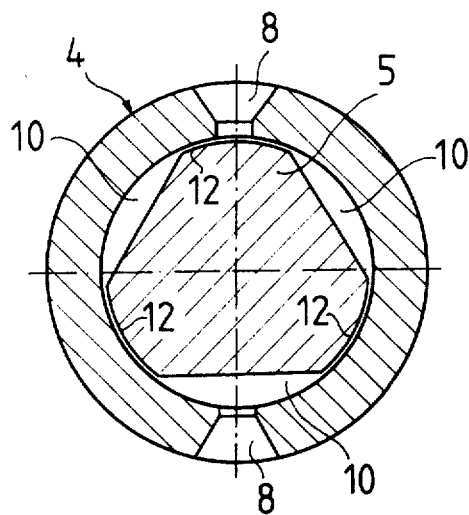
Figure 4:
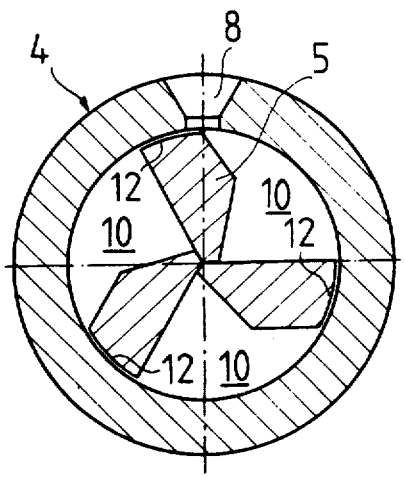

The number of nozzles 8 as well as the number of recesses 10 is quite freely selectable. In FIG. 3, the nozzle head 4 has two nozzles 8, and the rotating element 5 has three recesses 10 and three sealing faces 12. In FIG. 4 on the other hand, provided in the nozzle head 4 is a single nozzle 8, while the number of recesses 10 and of sealing surfaces 12, in the rotating element 5 consisting of 3 pieces welded together, is three each.

Figure 5:
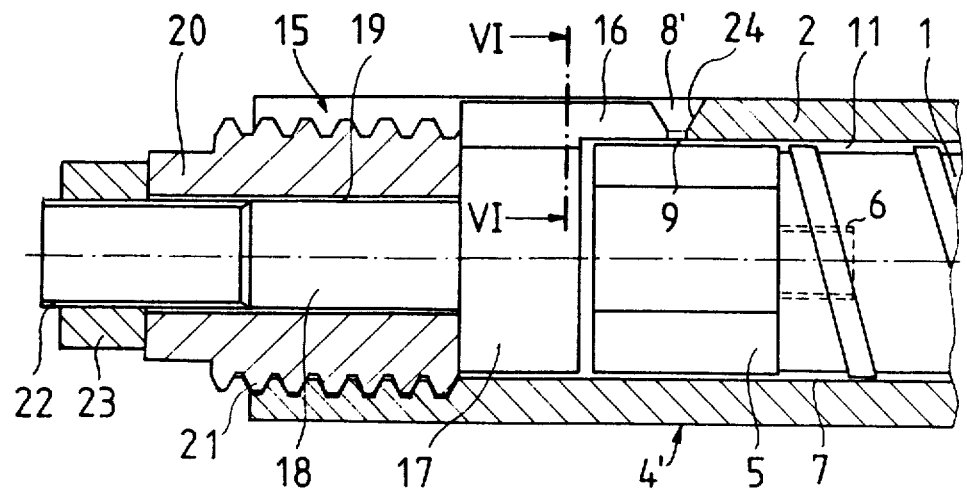
Figure 6:
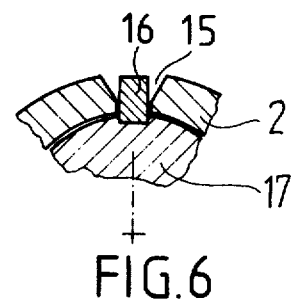

In the case of the form of embodiment according to FIGS. 5 and 6, provided at the periphery of the nozzle head 4' structured as a tube are slots 15, which, from the end of the nozzle head 4' lying away from the worm 1, extend into said nozzle head in the axial direction. Arranged displaceably in the axial direction of the nozzle head 4', in the slots 15, only one of which is visible in FIGS. 5 and 6, is one each key or wedge 16, and capable of being firmly maintained at a certain distance from the worm-side base surface 24 of the slot 15. For this purpose, the wedges 16 are attached at the periphery of a piston 17 that is guided rectilinearly in the axial direction in the cylindrical inner face 7. This piston has a piston rod 18 that extends out in the direction opposite to the worm-side and is guided in the axial direction in a boring 19 of a threaded ring 20 screwed into the nozzle head 4' via a trapezoidal thread connection 21. The piston rod 18 has, on its end facing away from the piston 17, a thread 22 and a nut 23 screwed onto this latter. By turning the threaded ring 20, the piston 17 can be displaced in the cylindrical inner face 7, and simultaneously the wedges 16 in the slots 15, and stopped in a desired position. In this fashion, influence can be exercised on the size and shape of the nozzle cross section and on operating pressure.

Figure 7:
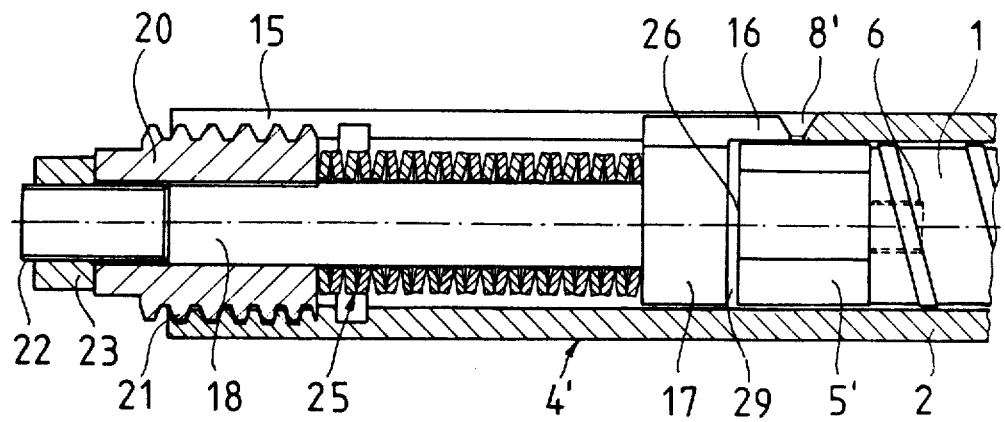

The form of embodiment in accordance with FIG. 7 differs from that in accordance with FIGS. 5 and 6 merely by the fact that the nozzle head 4 and the piston rod 18 are structured longer and that there is provided on the piston rod 18 a spring contrivance 25, made of leaf springs clamped onto one another, between the piston 17 and the threaded ring 20. The spring contrivance 25, which could also display one or several spiral springs, has a spring constant that is selected such that displacements of the piston 17 with the wedges 16, provoked by changes in operating pressure, change the nozzle cross section such that an at least approximately constant operating pressure is set automatically. This latter is set by a appropriately determined preloading of the spring contrivance 25, and changed by changing the preloading. The rotating element 5' of this form of embodiment is illustrated in perspective in FIG. 8 and displays teeth extending out from its piston-side forward face. These (teeth) are structured such that, in the course of their rotating motion, they process the dried-out stock possibly present in the space 29 and guide it to the recesses. From here it can then be pushed out via the nozzles 8'. The rotating element 5' here displays such a length that it can simultaneously act as a high power shearing element.

In the form of embodiment according to FIGS. 9 and 10, the nozzle head 4", firmly screwed to the housing 2, displays nozzles 8" running in the axial direction of the worm 1. The nozzle head side end of the worm 1 is simultaneously structured as a rotating element 5" which, therewith, consists of one piece with the worm 1. The recesses 10' are cut in at the outer rim of the nozzle head side forward face 26 such that they communicate with the space 11 guiding the stream of stock. The forward face 26 is divided by the recesses 10' into segments that are structured as sealing faces 12'. The worm 1 is pressed against the plane inner surface 27 of the nozzle head 4" containing the nozzle inlets 9 such that it is rotatable on said inner surfaces. The edges 14' of the sealing faces 12' running in the direction of rotation 13 serve for interrupting the stream of stock.

In operation, the stream of stock flows intermittently into nozzle inlets 9, via the recesses 10', and the edges 14' cut the axially exiting pieces of product from the stream of stock and from one another. In the intermediate sealing phases, the sealing faces 12' effect sealing of the nozzle inlets 9 against the stream of stock.

In an apparatus similar to that of FIG. 5 a radial (relatively to the axis of worm 1) aperture is provided in wedge (or key) 16. This radial aperture serves as a nozzle for extruding products even of complicated shape with dimensions of remarkable constancy. During the starting phase of the machine, the nozzle 8' is set with a large opening. As the temperature of the machine increases, the opening of nozzle 8' is reduced step by step by rotating the threaded ring 20. After the temperature has reached its steady state, the inlet 9 of nozzle 8' is entirely closed and the mixture is extruded only through the aperture in wedge (or key) 16.

When the wedge (or key) 16 of FIG. 7 is provided with such a radial aperture, there is the further advantage that when the nozzle 8 is closed eventual pressure build-ups are reduced because the piston 17 is pushed by the mixture against the spring contrivance 25 so that wedge (or key) 16 opens again the inlet 9 of nozzle 8'.

In the case of an extruder apparatus in accordance with FIGS. 7 and 8 with four nozzles 8', the following products were produced:

EXAMPLE 1

Whole kernel corn meal with more than 40% starch and ground to smaller than 5 mm, with a bulk density of about 0.5 kg/dm³, yielded an expanded product with a density of 0.2 kg/dm³ and a starch gelatinisation and degradation of more than 50%.

EXAMPLE 2

Soya extraction grits, ground smaller than 3 mm, with a bulk density of 0.4 kg/dm³ yielded an expanded product with a density of 0.3 kg/dm³ and a porous, fibrous structure whose water absorption capability amounted to 1.2 g per 1 g of product.

What is claimed is:

1. Apparatus for extruding pieces of an extrudable stock, comprising:
(a) a housing having a nozzle head;
(b) a tubular bore in said housing;
(c) a rotatable worm mounted in said bore having an outlet end located at said nozzle head;
(d) an interrupter mounted on said worm at said outlet end for rotation therewith;
(e) at least one nozzle in said nozzle head;
(f) at least one recess in said interrupter, formed and positioned to provide intermittent communication between said worm and said nozzle during rotation of said worm and interrupter;
(g) said interrupter further having a sealing face adjacent each recess to intermittently close said nozzle during rotation of said worm and interrupter, said recess and sealing face being so arranged as to alternately open and close said nozzler once per rotation of said worm and interrupter; and
(h) a nozzle construction wherein an axially extending slot is formed in the nozzle head and has a base surface at an end thereof, said nozzle construction having an axially moveable wedge with an end surface positioned within the slot, and means for firmly and adjustably holding the wedge in the slot at a selected distance from the base surface of the slot, said nozzle being formed between the end surface of said wedge and the base surface of said slot, said selected distance determining the nozzle size and being adjustable to vary the latter;
(i) said wedge being attached to the periphery of a piston that is axially displaceable in the tubular bore, said piston having a piston rod extending in a direction away from said worm, wherein the piston rod extends through an axial bore of a threaded ring which is threaded into the bore of said housing, and wherein means are provided to prevent movement of said rod relative to said threaded ring, said ring being axially adjustable to permit positioning of said wedge in said slot.

2. The apparatus of claim 1 wherein a spring contrivance is mounted on the piston rod between the piston and threaded ring to permit axial movement of said piston and piston rod with respect to said threaded ring in response to changes in operating pressure of the stock to thereby correspondingly alter the nozzle size.

3. Extruder installation for the production of a product, more particularly but not necessarily belonging to the group of expanded starch products or structured protein products, by action of pressure, friction, and possibly heat on an introduced material, said installation having a worm rotatably mounted in a housing to process the material and convey it to a nozzle head at an outlet end of said worm which has at least one nozzle by way of which the product issues from said nozzle head, said at least one nozzle being arranged so that the product issues from said nozzle head radially outwardly with respect to the axis of rotation of said worm, said at least one nozzle having variable cross sectional area, said nozzle head being a tube and having at least one slot extending in the axial direction of the tubular nozzle head, a key being disposed in said at least one slot so as to be displaceable in the axial direction of said tube and to be fixable relatively to said slot at a spacing from the end of said slot nearest said worm so that the spacing determines the nozzle cross-section and is variable to vary the latter.

4. Extruder installation according to claim 3 wherein said key is secured on the periphery of a piston displaceable in the interior of said tube in the axial direction, the piston having a piston rod which projects in the direction away from said worm and is axially guided in an axial bore of a threaded ring screwed into said tube, said piston rod at its end remote from said piston having a thread and a nut screwed thereon, the arrangement being such that by turning said threaded ring said key is displaceable axially relatively to said slot and can be fixed in a selected position.

5. Extruder installation according to claim 4 wherein a spring device is disposed on the piston rod between said piston and said threaded ring, said spring having characteristics adapted to the nozzle cross-section, and to a desired average operating pressure so that variations in operating pressure produce corresponding displacements of said piston with said key and modify the nozzle cross-section in such a manner that an at least approximately constant operating pressure is maintained.

6. Extruder installation according to claim 5 wherein said spring device comprises stacked convex disk springs.

7. Extruder installation according to claim 3 for the production of pieces of a product from a stream of material preferably expanded product pieces separate from one another, also having an interrupter for interrupting flow of material intermittently and for separating the product pieces from the flow of material, the interrupter being in the form of a rotary member which is operative between said worm and said nozzle head and is fixed relatively to said worm and rotates together with said worm, and has at least one recess adapted to guide the flow of material and to be brought into communication with said nozzle intermittently, and said rotary member also having at least one sealing surface adjoining each said recess, said sealing surface closing an inlet to said nozzle intermittently and sealing the same against the flow of material, and a leading edge of said sealing surface as considered in the direction of rotation of said rotary member on passing the nozzle inlet interrupting the flow of material to the nozzle and thus separating product pieces one after the other from the material flow.

8. Extruder installation according to claim 3, wherein an end face of said rotary member directed towards said piston comprises at least one tooth which projects in the direction of said piston and is shaped so as to remove from a space between said piston and said rotary member any material present in the said space.

9. Extruder installation according to claim 7 wherein said nozzle is arranged in an outer shell of said nozzle head, said recess being situated at the circumference of said rotary member, said sealing surface being formed at the periphery of said rotary member as a segment of a cylindrical surface and guided in a cylindrical inner surface of said outer shell, an edge being formed by an intersection line of a sealing surface with a recess.

10. Extruder installation according to claim 9 wherein said recess and edge extend in a straight line in the longitudinal direction of the worm.

11. Extruder installation according to claim 9 wherein said recess and edge extend spirally.

12. Extruder installation according to claim 7 wherein said rotary member is connected fast with said worm.

13. Extruder installation according to claim 7 wherein said rotary member is made in one piece with said worm.

14. Extruder installation according to claim 7 wherein said rotary member is constructed as an intensive cutting member.

15. Apparatus for extruding pieces of an extrudable stock, comprising:
(a) a housing having a nozzle head;
(b) a tubular bore in said housing;
(c) a rotatable worm mounted in said bore having an outlet end located at said nozzle head;
(d) an interrupter mounted on said worm at said outlet end for rotation therewith;
(e) means for adjustably forming a nozzle in said nozzle head, said forming means including a moveable element having an end surface, said housing including a non-moveable surface which together with the end surface of said movable element forms said nozzle;
(f) at least one recess in said interrupter, formed and positioned to provide intermittent communication between said worm and said nozzle during rotation of said worm and interrupter; and
(g) said interrupter further having a sealing face adjacent each recess to intermittently close said nozzle during rotation of said worm and interrupter by passing in close proximity to said end surface and said non-moveable surface, said recess and sealing face being so arranged as to alternately open and close said nozzle rotation rotation of said worm and interrupter;
(h) whereby said apparatus provides for intermittent extrusion of said stock to create lengths of extruded stock product while allowing cross sectional adjustability by moving the end surface of said moveable element with respect to the non-moveable surface of said housing.

* * * * *